(12) United States Patent
Ranganathan et al.

(10) Patent No.: US 8,151,122 B1
(45) Date of Patent: Apr. 3, 2012

(54) POWER BUDGET MANAGING METHOD AND SYSTEM

(75) Inventors: Parthasarathy Ranganathan, Fremont, CA (US); Nidhi Aggarwal, Fremont, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1306 days.

(21) Appl. No.: 11/773,759

(22) Filed: Jul. 5, 2007

(51) Int. Cl.
*G06F 1/00* (2006.01)

(52) U.S. Cl. ........ 713/300; 713/310; 713/324; 713/340; 714/2; 714/100

(58) Field of Classification Search ............... 713/300, 713/310, 324, 340; 714/100, 2
See application file for complete search history.

(56) References Cited

U.S. PATENT DOCUMENTS

| | | | | |
|---|---|---|---|---|
| 7,051,215 B2 * | 5/2006 | Zimmer et al. | ............... | 713/300 |
| 7,093,174 B2 | 8/2006 | Farkas et al. | | |
| 7,117,389 B2 | 10/2006 | Luick | | |
| 7,249,268 B2 * | 7/2007 | Bhandarkar | .................. | 713/320 |
| 7,281,146 B2 * | 10/2007 | Nalawadi et al. | ............. | 713/320 |
| 7,418,608 B2 * | 8/2008 | Kumar et al. | ................. | 713/320 |
| 7,460,929 B2 * | 12/2008 | Lopata | .......................... | 700/292 |
| 7,467,306 B2 * | 12/2008 | Cartes et al. | .................. | 713/300 |
| 7,509,505 B2 * | 3/2009 | Randall et al. | ................. | 713/300 |
| 7,536,573 B2 * | 5/2009 | Schumacher et al. | ........ | 713/320 |
| 7,539,881 B2 * | 5/2009 | Shaw et al. | .................... | 713/300 |
| 7,779,276 B2 * | 8/2010 | Bolan et al. | .................... | 713/300 |
| 7,814,349 B2 * | 10/2010 | Merkin et al. | ................. | 713/300 |
| 7,844,838 B2 * | 11/2010 | Naffziger et al. | ............. | 713/300 |
| 2003/0037150 A1 * | 2/2003 | Nakagawa | ..................... | 709/229 |
| 2003/0065958 A1 * | 4/2003 | Hansen et al. | ................. | 713/300 |
| 2005/0034023 A1 * | 2/2005 | Maturana et al. | ............... | 714/37 |
| 2005/0154931 A1 * | 7/2005 | Oh | ................................ | 713/300 |
| 2005/0289365 A1 * | 12/2005 | Bhandarkar | ................... | 713/300 |
| 2006/0005057 A1 * | 1/2006 | Nalawadi et al. | ............. | 713/320 |
| 2006/0149978 A1 * | 7/2006 | Randall et al. | ................. | 713/300 |
| 2007/0028130 A1 * | 2/2007 | Schumacher et al. | ........ | 713/320 |
| 2007/0047195 A1 * | 3/2007 | Merkin et al. | ................. | 361/685 |
| 2007/0074011 A1 | 3/2007 | Borkar et al. | | |
| 2007/0155375 A1 * | 7/2007 | Kappel et al. | ............. | 455/422.1 |
| 2007/0245161 A1 * | 10/2007 | Shaw et al. | .................... | 713/300 |
| 2008/0028236 A1 * | 1/2008 | Capps et al. | .................... | 713/300 |
| 2008/0028244 A1 * | 1/2008 | Capps et al. | .................... | 713/324 |
| 2008/0114997 A1 * | 5/2008 | Chin | .................................. | 713/321 |
| 2008/0222435 A1 * | 9/2008 | Bolan et al. | .................... | 713/310 |

* cited by examiner

Primary Examiner — Thomas Lee
Assistant Examiner — Jaweed A Abbaszadeh

(57) ABSTRACT

In a method for managing power budgets among a plurality of electronic components having respective power budgets, at least part of the power budget of an electronic component that has failed is dynamically re-allocated to at least one of the other plurality of electronic components, to thereby increase performance of the plurality of electronic components.

18 Claims, 7 Drawing Sheets

POWER BUDGET MANAGING METHOD AND SYSTEM

BACKGROUND

Blade servers (or blade PCs) represent a fast growing segment in the computing industry because of the compaction, consolidation, modularity, management, and maintenance afforded by the blade servers. In addition, the performance of blade servers, as well as other computing devices, is being increased through use of multi-core processors, which include multiple processing cores on the same die. The improvement in process technology enables ever increasing numbers of processing cores to be implemented in the computing devices.

Although multi-core processor systems have advantages over single core processor systems, users often face challenges with the multi-core processor systems. For instance, process variations may reduce the reliability of transistors, transient error rates may be high since capacitance on storage nodes is small and voltages are low, and reliability may deteriorate over time as the degradation of transistors may increase over time. These and other sources of problems may cause one or more of the processor cores to fail over time, even when the processor cores are determined to have passed factory testing.

In instances where a multi-core processor system is operated with one or more failed processor cores, the amount of processing power decreases, thereby substantially reducing the efficiency of the multi-core processor system. Typically, therefore, when a processor core fails, the entire multi-core processor system is discarded, which substantially increases the total cost of ownership of systems associated with operating systems having multiple cores. It would therefore be desirable to be able to efficiently utilize the multi-core processor system in situations where one or more of the processor cores have failed.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and system for managing power budgets among a plurality of electronic components having respective power budgets. More particularly, the method and system disclosed herein pertain to the dynamic re-allocation of a power budget assigned to an electronic component that has failed. An electronic component may be considered to have failed, for instance, if the electronic component operates at a relatively reduced operating level or has ceased to operate completely.

In one regard, the plurality of electronic components share an overall power budget and the failed electronic component power budget is re-allocated to one or more of the remaining electronic components to thereby attempt to substantially maintain the overall power budget among the electronic components. As such, for instance, as a group, the electronic components may be operated in a substantially optimized manner.

Figure 1A:
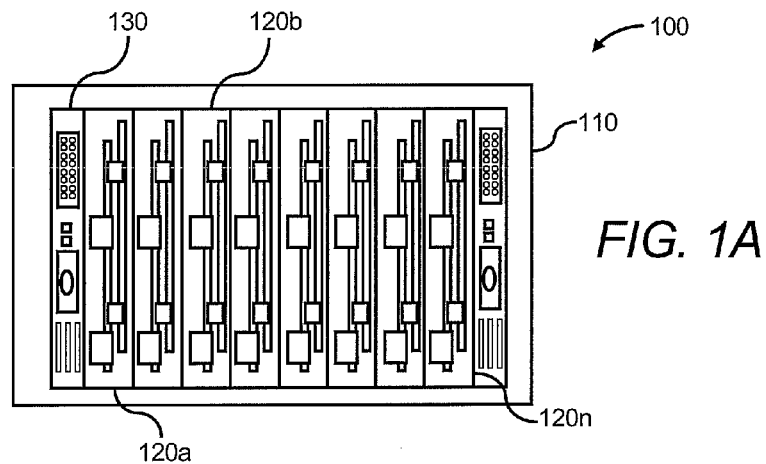
FIG. 1A shows a simplified frontal view of an electronic environment in which various embodiments of the invention may be practiced, according to an embodiment of the invention.

With reference first to FIG. 1A, there is shown a simplified frontal view of an electronic environment 100 in which various embodiments of the invention may be practiced. The electronic environment 100 depicted in FIG. 1A generally comprises an enclosure 110 housing a number of electronic components 120a-120n, such as, computer systems, servers, blade servers, memories, hard drives, etc. The electronic components 120a-120n are depicted as comprising blade PCs arranged in horizontal alignment with respect to each other in the enclosure 110. The electronic systems 120 are also depicted as including various components generally known to form part of conventional electronic systems, such as, various connectors, buttons, indicators, etc. The electronic components 120a-120n may further include multi-core processor systems as described herein below.

The enclosure 110 may include other components, such as, interconnects 130, which generally operate to route network signals from the electronic components 120a-120n. Two interconnects 130 may be employed to provide redundancy for the electronic components 120a-120n.

Although the enclosure 110 has been illustrated as having eight electronic components 120a-120n and two interconnects 130, the enclosure 110 may include any reasonably suitable number of electronic components 120a-120n and interconnects 130 without departing from a scope of the invention. In addition, the electronic environment 100 may include additional components and some of the components depicted may be removed and/or modified without departing from a scope of the electronic environment 100.

It should also be understood that various embodiments of the invention may be practiced in environments having configurations that differ from the electronic environment 100 depicted in FIG. 1A. By way of example, various embodiments of the invention may be practiced in electronic environments having different types of components 120a-120n, for instance, in electronic environments having horizontally arranged servers or other computing devices. In addition, or alternatively, various embodiments of the invention may be practiced in a larger scale computing environment in comparison with the electronic environment 100 depicted in FIG. 1A.

Figure 1B:
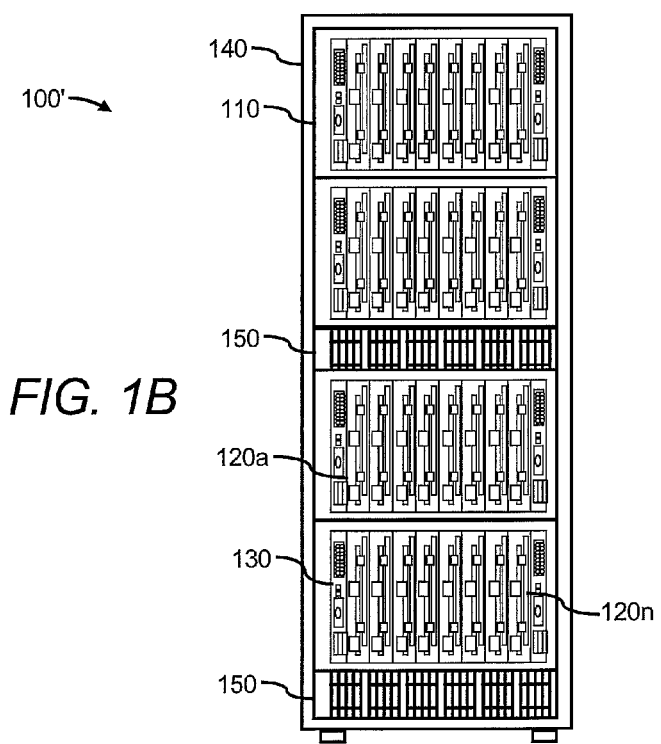
FIG. 1B shows illustrates a simplified frontal view of another electronic environment in which various embodiments of the invention may be practiced, according to an embodiment of the invention.

An example of a larger scale electronic environment 100' is depicted in FIG. 1B. More particularly, FIG. 1B illustrates a simplified frontal view of a rack 140, such as, an electronics cabinet, housing four enclosures 110. The rack 140 is also depicted as including two sets of power supplies 150. The rack 140 may, however, house any reasonably suitable number of enclosures 110, such as, six, eight, or more, as well as any reasonably suitable number of power supplies 150. In addition, the enclosures 110 included in the rack 140 may also house any reasonably suitable number of electronic components 120a-120n.

Various embodiments of the invention may further be practiced in electronic environments containing a relatively larger number of electronic components 120a-120n than are depicted in FIG. 1B. For instance, various embodiments of the invention may be practiced amongst electronic systems contained in a data center or electronic components positioned at different geographic locations with respect to each other. The different geographic locations may include, for instance, different rooms, different buildings, different counties, different countries, etc.

Figure 1C:
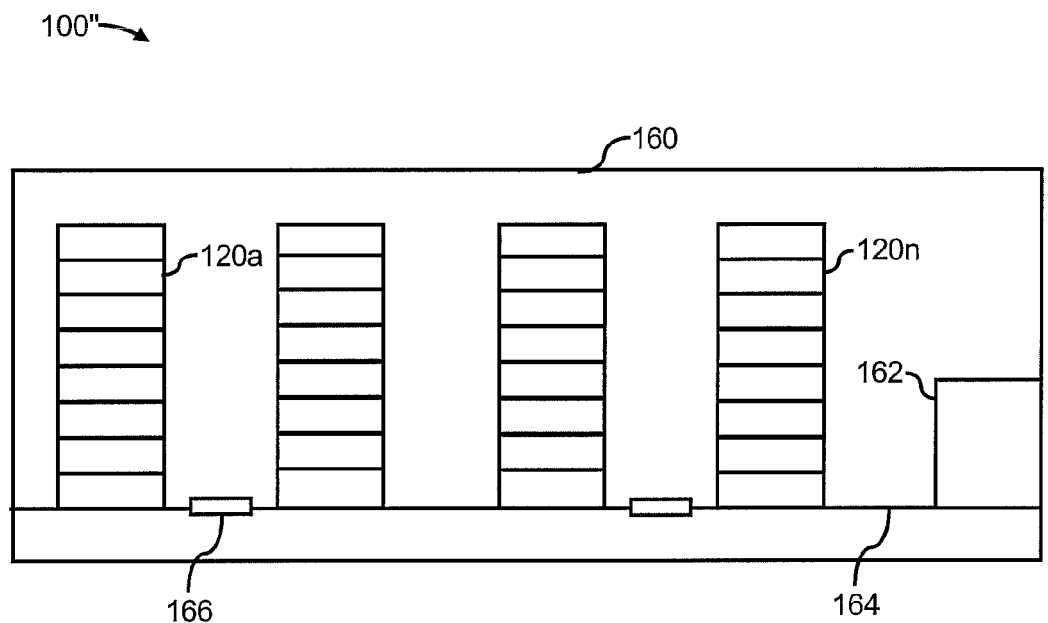
FIG. 1C shows illustrates a simplified side view of another electronic environment in which various embodiments of the invention may be practiced, according to an embodiment of the invention.

An example of a relatively larger electronic environment 100" is depicted in FIG. 1C, which shows a simplified side view of a data center container 160. As shown, the data center container 160 may comprise a self-contained "data center" comprising a plurality of electronic components 120a-120n and a cooling system 162, such as, an air conditioning system. The data center container 160 is also depicted as including a raised floor 164 and vents 166 for supplying airflow from the cooling system 162 to the electronic components 120a-120n. By way of example, the data center container 160 may be formed in a shipping container, or other movable structure.

Figure 2A:
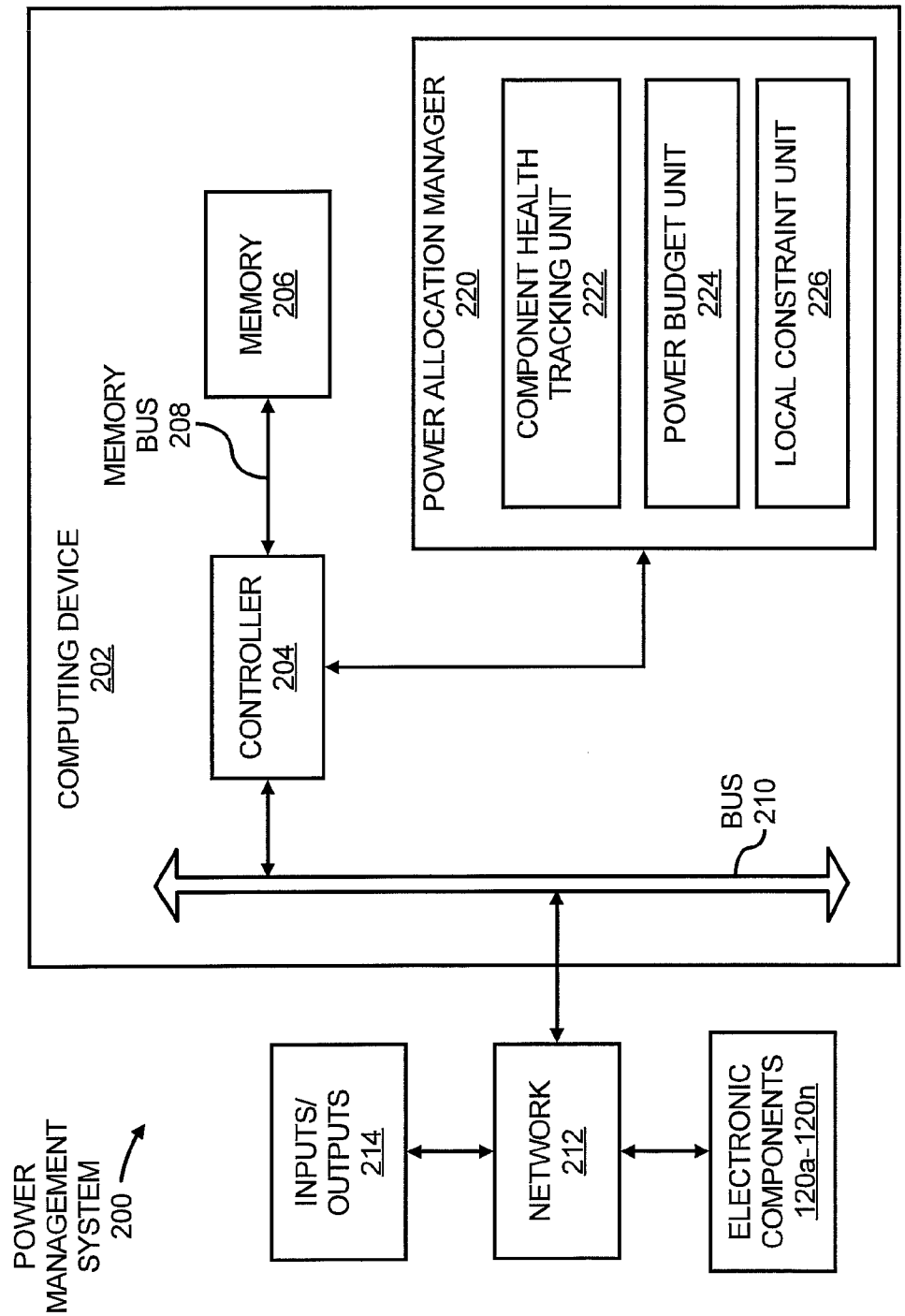
FIG. 2A illustrates a block diagram of a power management system according to an embodiment of the invention.

With reference now to FIG. 2A, there is shown a block diagram of a power management system 200, according to an example. It should be understood that the following description of the power management system 200 is but one manner of a variety of different manners in which such a power management system 200 may be operated. In addition, it should be understood that the power management system 200 may include additional components and that some of the components described may be removed and/or modified without departing from a scope of the power management system 200.

The following description of the power management system 200 makes specific reference to the elements depicted in the electronic environments 100, 100', 100". It should, however, be understood that the power management system 200 may be implemented in environments that differ from those environments 100, 100', 100" depicted in FIGS. 1A-1C, as described above.

As shown in FIG. 2A, the power management system 200 includes a computing device 202 configured to perform various power-related functions with respect to the electronic components 120a-120n. More particularly, for instance, the computing device 202 includes a power allocation manager 210 that is generally configured to dynamically re-allocate power budgets among a plurality of electronic components 120a-120n, for instance, when one or more of the electronic components 120a-120n fail, to thereby increase performance of the electronic components 120a-120n. In addition, the power allocation manager 210 may control the manners in which the power budgets are re-allocated based upon one or more factors, as described in greater detail herein below.

The computing device 202 may comprise, for instance, any of the electronic components 120a-120n discussed above. In addition, or alternatively, the computing device 202 may comprise a separate computing device, such as, a personal computer configured to communicate with the electronic components 120a-120n.

In any regard, the computing device 202 includes a controller 204, which may comprise a microprocessor, a microcontroller, an application specific integrated circuit (ASIC), and the like, configured to perform various processing functions in the computing device. More particularly, for instance, the controller 204 is configured to invoke or implement the power allocation manager 220 in allocating the power budgets of one or more electronic components 120a-120n that fail to one or more other electronic components 120a-120n, subject to one or more conditions, as described in greater detail herein below. The controller 204 may also access a memory 206 configured to store software or algorithms that provide the functionality of the controller 204 over a memory bus 208. The memory 206 may comprise, for instance, volatile or non-volatile memory, such as DRAM, EEPROM, MRAM, flash memory, floppy disk, a CD-ROM, a DVD-ROM, or other optical or magnetic media, and the like.

The power allocation manager 220 may comprise software, hardware, firmware, or a combination thereof, configured to perform the power budget re-allocation operations discussed herein. In one example where the power allocation manager 220 comprises software, the power allocation manager 220 may be stored in the memory 206. In another example where the power allocation manager 220 comprises firmware or hardware, the power allocation manager 220 may comprise a device that is separate from the memory 206.

In addition, or alternatively, the power allocation manager 220 may comprise, for instance, a centralized module in an enclosure manager (not shown) of an enclosure 110 or as a distributed control agent on one or more of the individual electronic components 120a-120n. In addition, or alternatively, the power allocation manager 220 may comprise a control agent stored in one or more electronic components outside of an enclosure 110.

The power allocation manager 220 is depicted as including a component health tracking unit 222, a power budget unit 224, and a local constraint unit 226, which the power allocation manager 220 may implement in performing a power budget re-allocation operation. The units 222-226 may also comprise hardware, software, firmware, or a combination thereof.

The controller 204 is configured to invoke or implement the component health tracking unit 222 to track the health statuses of the electronic components 120a-120n. More particularly, for instance, the component health tracking unit 222 may track whether one or more of the electronic components 120a-120n have failed. In one example, the component health tracking unit 222 may substantially continuously track the operating statuses of the electronic components 120a-120n through any reasonably suitable known tracking operation. In another example, the component health tracking unit 222 may track the operating statuses through, for instance, a routine pinging of the electronic components 120a-120n. In any regard, the controller 204 may store the operating statuses in the memory 206.

The controller 204 is configured to invoke or implement the power budget unit 224 to determine the power budgets of the electronic components 120a-120n, to determine the power budgets available on the electronic components 120a-120n, and to vary the power budgets of one or more of the electronic components 120a-120n. The power budgets of the electronic components 120a-120n may include, for instance, the rated power levels electronic components 120a-120n, which may be considered as electrical power budgets. The electrical power budgets may also include, for instance, the maximum rated amount of electricity that the electronic components 120a-120n may consume, as limited by a fuse. By way of example, if the electronic components 120a and 120b comprise processors in a server having dual-core processors rated at 150 W, each of the cores may be rated around 75 W. Similarly, if the electronic components 120a-120n comprise blades in an enclosure 110 rated at 500 W with 20 blades, each of the blades 120a-120n may be rated around 25 W.

The power budgets of the electronic components 120a-120n may also include respective thermal power budgets, which determine the maximum heat that may be dissipated from a respective electronic component 120a-120n. The maximum heat dissipation may be determined by the cooling capacity of cooling components configured to dissipate the heat generated by the electronic components 120a-120n. The cooling components may include, for instance, heat sinks, fans, etc.

The power budget unit 224 may be configured to identify one or more of the electronic components 120a-120n having available power budget. The available power budget may include either or both of an electrical power budget and a thermal power budget. According to an example, an electronic component 120a-120n may be considered as having available power budget even when the electronic component 120a-120n is operating a maximum rated level. In other words, the electronic components 120a-120n may be operated at levels beyond their rated levels, within prescribed limits.

In addition, responsive to a determination that one or more of the electronic components 120a-120n have failed, the power budget unit 224 is further configured to re-allocate the power budget(s) of the one or more failed electronic components 120a-120n to the one or more electronic component(s) 120a-120n having available power budget(s), which may include either or both of electrical power budget(s) and thermal power budget(s).

The re-allocation of the power budget may, however, also be subject to one or more local constraints as identified by the local constraint unit 226. For instance, the controller 204 may invoke or implement the local constraint unit 226 to identify one or more constraints that restrict the re-allocation of the power budget. The local constraint unit 226 may, more particularly, distinguish workloads based upon their relative priorities as identified, for instance, in a service level agreement ("SLA"), other provisions that define the relative priorities of one or more workloads performed on the electronic components 120a-120n, other provisions regarding the number and availability of electronic components 120a-120n that are to be devoted to particular workloads as identified in an SLA, etc. The local constraints may also include other physical constraints, such as, power supply curves of separate power supplies for the electronic components 120a-120n.

In order to distinguish between the workloads and to also obtain the various provisions discussed above, the controller 204 may communicate with one or more inputs and outputs 214. The inputs and outputs 214 may comprise one or more other computing devices through which the provisions from an SLA may be inputted into the computing device 202. The inputs and outputs 214 may additionally comprise computing devices from which the workloads to be performed on the electronic components 120a-120n may originate. In this regard, the computing device 202 or the controller 204 may also function in a workload manager capacity. More particularly, for instance, the computing device 202 or the controller 204 may be configured to allocate and/or track the placement of workloads among the electronic components 120a-120n. In one regard, the computing device 202 or the controller 204 may allocate the workloads according to priorities, cooling provisioning, SLA provisions, etc.

In any regard, the controller 204 may communicate with the inputs/outputs 214 as well as the electronic components 120a-120n through a network 212. In addition, the controller 204 may be connected to the network 212 through a bus 210.

In one example, the local constraint unit 226 may receive the local constraint(s) as inputs from the inputs/outputs 214 and may store the local constraint(s) in the memory 206. In addition, the controller 204 may invoke or implement the local constraint unit 226 to identify any potential local constraints that may affect a re-allocation scheme derived by the power budget unit 224. As discussed below, either or both of the power budget allocation scheme and a local constraint may be revised if a determination that a local constraint applies is made.

The power management system 200 discussed with respect to FIG. 2A is generally applicable to re-allocate the power budget of a failed electronic component 120a to one or more other electronic components 120b-120n. The electronic component(s) 120b-120n to which the power budget is re-allocated may comprise those electronic component(s) 120b-120n that share an overall power budget with the failed electronic component 120a, and may thus be considered as being "grouped" with the failed electronic component 120a. The groups of electronic components 120a-120n that share an overall power budget may include, for instance, all of the servers in a data center, all of the servers in a group of racks, all of the servers in a single rack, all of the servers in a sever enclosure 110, all of the processors in a server, etc.

Figure 2B:
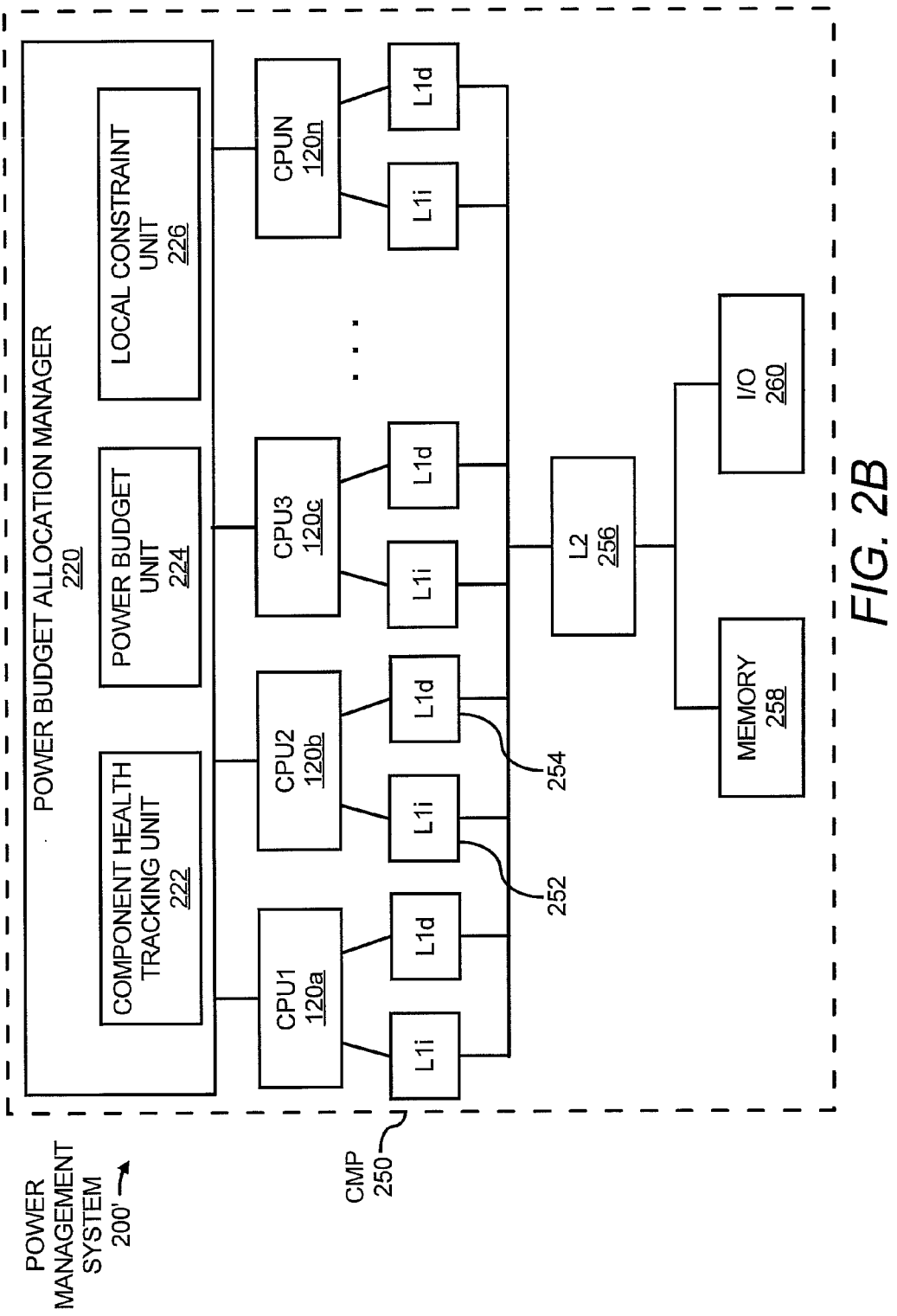
FIG. 2B illustrates a block diagram of a power management system according to another embodiment of the invention.

With reference now to FIG. 2B, there is shown a block diagram of a power management system 200', according to another example. The power management system 200' depicted in FIG. 2B differs from the power management system 200 depicted in FIG. 2A, in that, the power management system 200' depicts the electronic components 120a-120n as cores in a chip-level multi-core processor (CMP) system 250. The CMP system 250 includes multiple, diverse processor cores 120a-120n that are all capable of executing the same instruction set. Each of the processor cores 120a-120n may have the same or significantly different power budgets.

The CMP system 250 hosts an operating system and application software that may execute single-threaded or multi-threaded. The operating system dispatches processing jobs to individual core processors 120a-120n, which are capable of executing one or more processes or threads at a time.

The CMP system 250 includes a pool of similar or dissimilar processor cores 120a-120n that receive their respective power supplies from a power budget allocation manager 220. As discussed above, the power budget allocation manager 220 is configured to track the health of each of the core processors 120a-120n, to identify the power budgets and available power budgets of each of the core processors 120a-120n, and to identify whether local constraints are applicable to any of the core processors 120a-120n.

As shown in FIG. 2B, each of the core processors 120a-120n has a corresponding first level instruction cache (L1i) 252, and a corresponding first level data cache (L1d) 254. These all share a common second level cache (L2) 256, a main memory 258, and input/output (I/O) device 260. The operating system and application software execute from the main memory 258 and are cached up through the respective second and first level caches 252-256 to the processor cores 120a-102n.

Figure 3A:
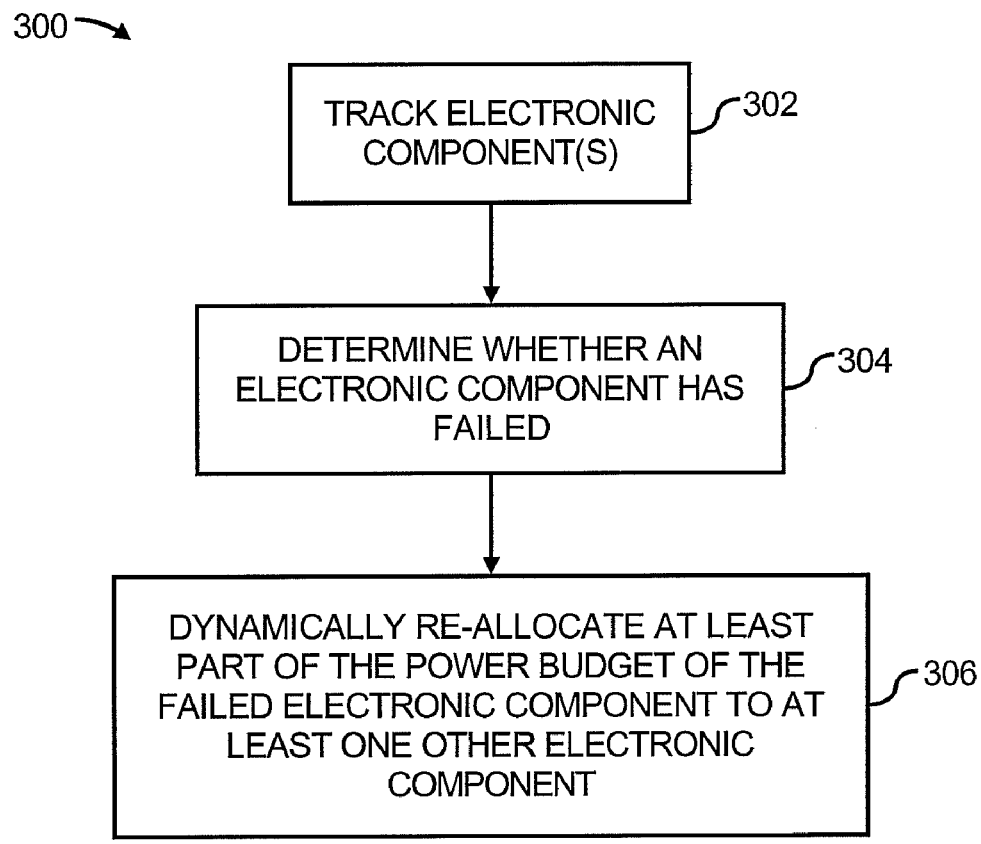
FIG. 3A illustrates a flow diagram of a method for managing power budgets among a plurality of electronic components having respective power budgets, according to an embodiment of the invention.

Turning now to FIG. 3A, there is shown a flow diagram of a method 300 for managing power budgets among a plurality of electronic components having respective power budgets, according to an example. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

The description of the method 300 is made with reference to the power management systems 200, 200' illustrated in FIGS. 2A and 2B, and thus makes reference to the elements cited therein. It should, however, be understood that the method 300 is not limited to the elements set forth in the power management systems 200, 200'. Instead, it should be understood that the method 300 may be practiced by a system having a different configuration than those set forth in the power management systems 200, 200'.

At step 302, the component health tracking unit 222 may be invoked or implemented to track the health of each of the electronic components 120a-120n. As discussed above, the health of each electronic component 120a-102n may be tracked in any reasonably suitable manner that determines whether any of the electronic components 120a-120n has failed or are otherwise operating improperly. By tracking the respective healths of the electronic components 120a-120n, the component health tracking unit 222 may determine whether one or more of the electronic components 120a-120n have failed, as indicated at step 304.

At step 306, the power budget unit 224 may be invoked or implemented to dynamically re-allocate at least part of the power budget of the one or more electronic components 120a-120n that have failed to at least one other electronic component 120a-120n. More particularly, for instance, the electronic components 120a-120n may be included in a group that shares an overall power budget. As such, at step 306, the power allocation manager 220 may dynamically re-allocate at least part of the power budget from the failed electronic component 120a-120n to at least one other electronic component 120a-120n to substantially maintain the overall power budget and thereby increase the performance of the electronic components 120a-120n.

According to an example, if an electronic component 120a is operating at its assigned power budget level and an additional power budget is allocated to that electronic component 120a, that electronic component 120a may be overclocked, such that the electronic component 120a operates at a level beyond its originally allocated power budget. The electronic component 120a may be overclocked, for instance, by increasing its P-state, as is provided in various standards, such as, ACPI. In this regard, the supply voltage must be increased to address the increase in frequency. More particularly, given that power is proportional to the product of the frequency and the voltage squared, the increased frequency is likely to be limited to the cube root of the amount of power available from the faulty electronic component 120a.

The dynamic re-allocation of the power budget, however, may substantially be limited based upon thermal considerations of the electronic components 120a-120n and various other local constraints. More particularly, for instance, the thermal packaging of the electronic device 120b on which the power budget is re-allocated should be able to support the additional localized heat generation. Otherwise, the additional heat generated in the electronic components 120a-120n may not be adequately dissipated, which may cause the electronic components 120a-120n to become damaged or otherwise fail. As such, judicious design decisions should be employed in determining how the power budgets should be re-allocated.

By way of particular example to processor cores 120a-120n, assume that when two faulty processor cores 120a and 120b are retired in an eight processor core 120a-120h system, the remaining processor cores 120c-120h may be overclocked by the cube root of 8/6, which is approximately 10%. In addition, when four faulty processor cores 120a-120d are retired, the remaining processor cores 120e-120h may be overclocked by the cube root of 8/4, which is approximately 25%.

Figure 3B:
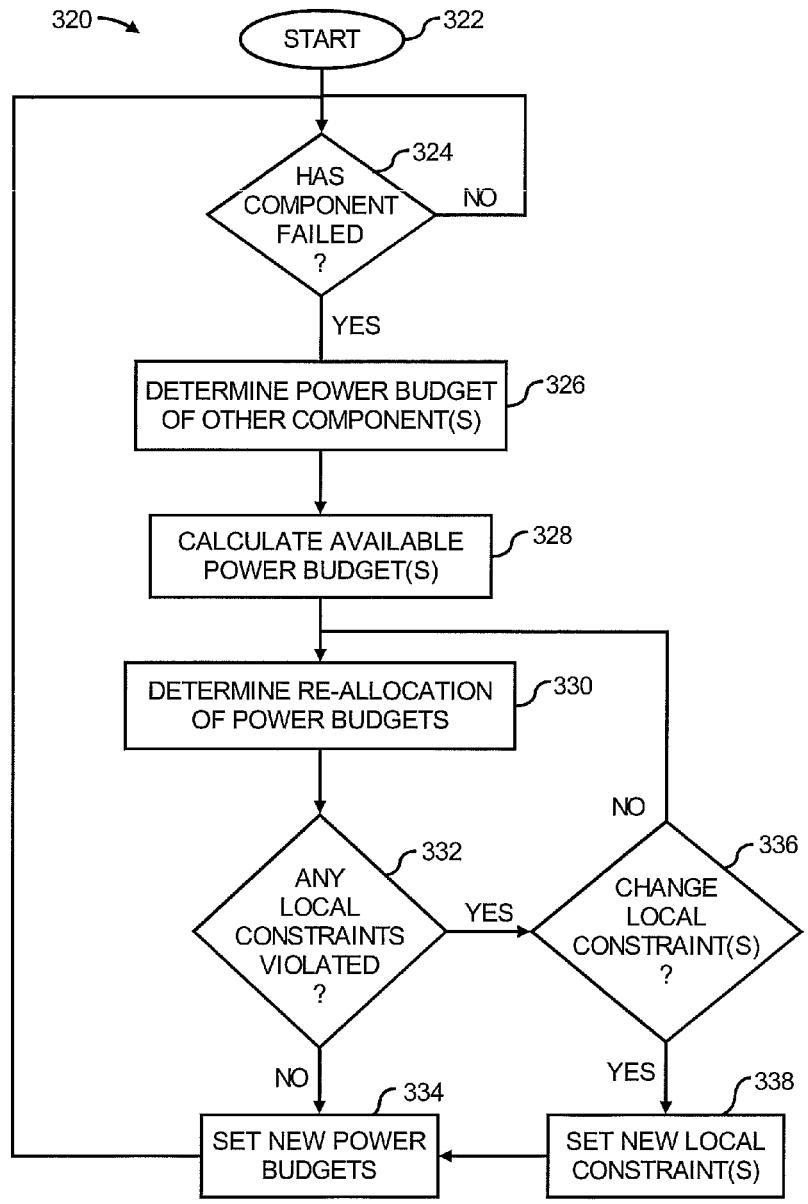
FIG. 3B illustrates a flow diagram of a method for managing power budgets among a plurality of electronic components having respective power budgets, according to an embodiment of the invention.

With reference now to FIG. 3B, there is shown a flow diagram of a method 320 for managing power budgets among a plurality of electronic components having respective power budgets, according to an example. The method 320 provides a more detailed depiction of the steps outlined in the method 300. In addition, it is to be understood that the following description of the method 320 is but one manner of a variety of different manners in which an example of the invention may be practiced. It should also be apparent to those of ordinary skill in the art that the method 320 represents a generalized illustration and that other steps may be added or existing steps may be removed, modified or rearranged without departing from a scope of the method 320.

The method 320 may be initiated at step 322 in response to any of a number of stimuli or conditions. For instance, the method 320 may be initiated with activation of the components in the electronic components 120a-120n. In addition, or alternatively, the method 320 may be manually initiated or the power allocation manager 220 may be programmed to initiate the method 320 at various times, for a set duration of time, substantially continuously, etc.

At step 324, similarly to steps 302 and 304 in FIG. 3A, the controller 204 may invoke or implement the component health tracking unit 222 to monitor and determine when one or more of the electronic components 120a-120n have failed. If none of the electronic components 120a-120n have been determined as having failed, the component health tracking unit 222 may be implemented to continuously track the healths of the electronic components 120a-120n at step 324.

If one or more of the electronic components 120a-120n in a group sharing an overall power budget is determined to have failed at step 324, the controller 204 may invoke or implement the power budget unit 224 to determine the power budgets of the remaining electronic components 120a-120n in the group, as indicated at step 326. In addition, at step 328, the power budget unit 224 may calculate the available power budgets of the remaining electronic components 120a-120n in the group. The available power budgets may include both the available electrical power budgets and the available thermal power budgets. Thus, for instance, the power budget unit 224 may determine that although an electronic component 120a has sufficient electrical power budget to receive an additional power budget, that the electronic component 120a may not have a sufficient thermal power budget to adequately cool the electronic component 120a with the additional power budget.

At step 330, the power budget unit 224 may determine which of the electronic components 120a-120n having available power budgets are to receive the power budget of the failed electronic component(s) 120a-120n. In making this determination, the power budget unit 224 may consider a number of various factors, such as, provisions in an SLA, workload priorities, physical limitations, ambient temperatures, and other local constraints. In one regard, the power budget unit 224 may optimize the re-allocation, such that, violations of the local constraints are substantially minimized.

In addition, at step 332, the local constraint unit 226 may determine whether any of the local constraints will be violated if the re-allocation determined at step 330 is implemented. If none of the local constraints are deemed to be violated, at step 334, the power budget unit 224 may implement the re-allocation of power budgets among the electronic components 120a-120n determined at step 330.

If, however, the local constraint unit 226 determines that a local constraint will be violated, the local constraint unit 226 may determine whether the local constraint may be changed, at step 336. By way of example, if the local constraint is a provision in an SLA, the local constraint unit 226 may determine that the provision may be changed, for instance, if the SLA indicates that the provision may be changed in various circumstances or if a user is authorized to manually override enforcement of the provision.

If the local constraint may be changed at step 336, the new local constraint may be set at step 338. The new local constraint may be stored in the memory 206, for instance. In addition, the new power budgets determined at step 330 may be set at step 334.

If, however, the local constraint may not be changed at step 336, the power budget unit 224 may determine another re-allocation of power budgets that does not violate the local constraint previously identified at step 332, as indicated at step 330. In addition, steps 330-338 may be repeated until a power budget re-allocation scheme that does not violate any unchangeable local constraints is determined.

The methods 300 and 320 may be implemented in a substantially continuous manner to monitor for failed components and to re-allocate power budgets in response to one or more of the components failing.

The operations set forth in the methods 300 and 320 may be contained as a utility, program, or subprogram, in any desired computer accessible medium. In addition, the methods 300 and 320 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
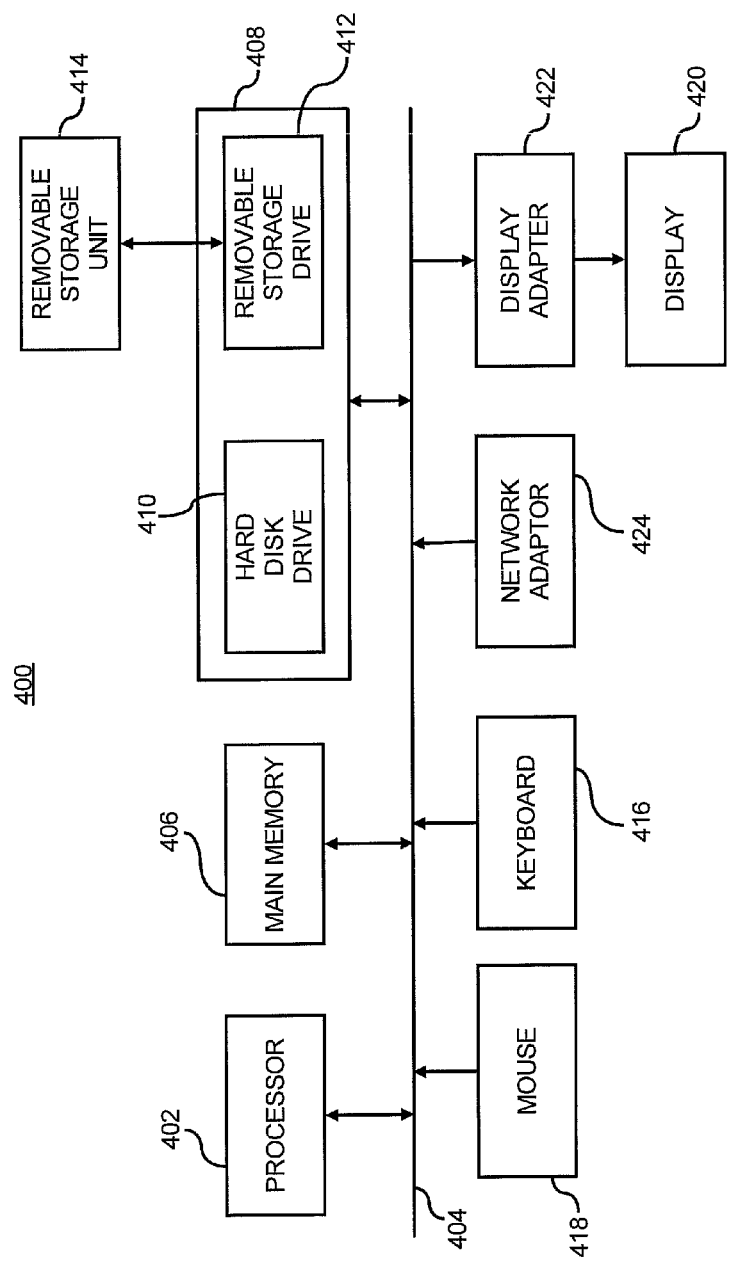
FIG. 4 illustrates a computer system, which may be employed to perform various functions described herein, according to an embodiment of the invention.

FIG. 4 illustrates a computer system 400, which may be employed to perform the various functions of the computing device 202 and the CMP system 250 described herein above, according to an example. In this respect, the computer system 400 may be used as a platform for executing one or more of the functions described hereinabove with respect to the computing device 202 and the CMP system 250.

The computer system 400 includes one or more controllers, such as a processor 402. The processor 402 may be used to execute some or all of the steps described in the methods 300 and 320. Commands and data from the processor 402 are communicated over a communication bus 404. The computer system 400 also includes a main memory 406, such as a random access memory (RAM), where the program code for, for instance, the computing device 202 and the CMP system 250, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the management of power may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, for instance, the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for managing power budgets among a plurality of electronic components having respective power budgets, said method comprising:

dynamically re-allocating, by a processor, at least part of the power budget of an electronic component that has failed to at least one of the other plurality of electronic components, to thereby increase performance of the plurality of electronic components, wherein the plurality of electronic components comprise processor cores in a multi-core processor system, and wherein dynamically re-allocating at least part of the power budget further comprises dynamically re-allocating at least part of the power budget of a processor core that has failed to another processor core of the multi-core processor system.

2. The method according to claim 1, further comprising:
determining the power budget of the at least one of the other plurality of electronic components;
calculating an available power budget of the at least one of the other plurality of electronic components from the determined power budget; and
wherein dynamically re-allocating at least part of the power budget further comprises dynamically re-allocating an amount of the power budget of the electronic component that has failed to the at least one of the other plurality of electronic components according to the calculated available power budget of the at least one of the other plurality of electronic components.

3. The method according to claim 2, wherein the power budget comprises an electrical power budget and a thermal power budget, and wherein dynamically re-allocating at least part of the power budget further comprises dynamically re-allocating at least part of the power budget to at least one of the other plurality of electronic components based upon at least one of the calculated electrical and thermal power budgets available in the other plurality of electronic components.

4. The method according to claim 1, further comprising:
determining a proposed re-allocation of the at least part of the power budget; and
wherein dynamically re-allocating at least part of the power budget further comprises dynamically re-allocating at least part of the power budget to a plurality of electronic components according to the proposed re-allocation of the at least part of the power budget.

5. The method according to claim 4, further comprising:
determining whether at least one local constraint affects one or more of the plurality of electronic components; and
wherein dynamically re-allocating at least part of the power budget further comprises dynamically re-allocating at least part of the power budget subject to the at least one local constraint.

6. The method according to claim 5, wherein the at least one local constraint comprises available power budgets of the plurality of electronic components, said method further comprising:
determining the power budgets of a plurality of the electronic components;
calculating the available power budgets of the plurality of the electronic components from the determined power budget; and
wherein dynamically re-allocating at least part of the power budget further comprises dynamically re-allocating an amount of power budget of the electronic component that has failed to the plurality of electronic components subject to their respective available power budgets.

7. The method according to claim 5, wherein the at least one local constraint comprises cooling provisioning constraints of the plurality of electronic components, and wherein dynamically re-allocating at least part of the power budget further comprises dynamically re-allocating at least part of the power budget of the electronic component that has failed to the plurality of electronic components subject to their respective cooling provisioning constraints.

8. The method according to claim 5, wherein the at least one local constraint comprises at least one of a provision in a service level agreement, a determined priority of a workload, and a historical performance analysis.

9. The method according to claim 4, further comprising:
determining whether at least one local constraint has been violated; and
wherein dynamically re-allocating at least part of the power budget to a plurality of electronic components further comprises dynamically re-allocating at least part of the power budget in response to the at least one local constraint remaining intact.

10. The method according to claim 4, further comprising:
determining whether at least one local constraint has been violated;
in response to a determination that at least one local constraint has been violated, determining whether the at least one local constraint is changeable;
changing the at least one local constraint in response to a determination that the at least one constraint should be changed; and
determining another proposed re-allocation of the at least part of the power budget in response to a determination that the at least one local constraint should not be changed.

11. The method according to claim 1, wherein the plurality of electronic components further comprise servers in a data center container, and wherein dynamically re-allocating at least part of the power budget further comprises dynamically re-allocating at least part of the power budget of a server that has failed to another server in the data center container.

12. A power budget allocation manager comprising:
a component health tracking unit configured to track an operating status of a plurality of electronic components, each of said plurality of electronic components having a respective power budget; and
a power budget unit configured to dynamically re-allocate at least part of the power budget of an electronic component determined to have failed to at least one of the plurality of electronic components determined to be operational,
wherein the plurality of electronic components comprise processor cores in a multi-core processor system, and wherein the power budget unit is configured to dynamically re-allocate at least part of the power budget of the failed processor core to at least one of the plurality of processor cores determined to be operational.

13. The power budget allocation manager according to claim 12, wherein the plurality of electronic components share an overall power budget, wherein the power budgets comprise electrical power budgets and thermal power budgets, wherein the electrical power budgets define rated maximum power consumption levels and the thermal power budgets define rated maximum heat dissipation levels available to the plurality of electronic components, and wherein the power budget unit is further configured to re-allocate the power budget of the failed electronic component to at least one of the plurality of electronic components based upon their respective electrical and thermal power budgets.

14. The power budget allocation manager according to claim 12, further comprising:
a local constraint unit configured to identify a least one constraint applicable to the re-allocation of the power budget to the at least one of the plurality of electronic components, wherein the power budget unit is further configured to dynamically re-allocating the power budget subject to the at least one constraint.

15. The power budget allocation manager according to claim 14, wherein the local constraint unit is further configured to determine whether at least one constraint will be violated if a proposed power budget re-allocation scheme is implemented, and wherein the power budget unit is further configured to modify the proposed power budget re-allocation scheme based upon a determination that the at least one constraint will be violated.

16. The power budget allocation manager according to claim 15, wherein the local constraint unit is further configured to determine whether the at least one constraint is changeable, to change the at least one constraint such that it is not violated, and wherein the power budget unit is further configured to implement the proposed power budget re-allocation scheme.

17. The power budget allocation manager according to claim 12, wherein the plurality of electronic components comprise at least one of servers and processors.

18. A non-transitory computer readable storage medium on which is embedded one or more computer programs, said one or more computer programs implementing a method for managing power budgets among a plurality of electronic components having respective power budgets, said one or more computer programs comprising a set of instructions to:

track operational statuses of the plurality of electronic components;

determine that an electronic component of the plurality of electronic components has failed; and dynamically re-allocate at least part of the power budget of the electronic component that has failed to at least one of the other plurality of electronic components, to thereby increase performance of the plurality of electronic components, wherein the plurality of electronic components comprise processor cores in a multi-core processor system, and wherein dynamically re-allocate at least part of the power budget further comprises dynamically re-allocate at least part of the power budget of a processor core that has failed to another processor core of the multi-core processor system.

* * * * *

UNITED STATES PATENT AND TRADEMARK OFFICE
CERTIFICATE OF CORRECTION

PATENT NO. : 8,151,122 B1  
APPLICATION NO. : 11/773759  
DATED : April 3, 2012  
INVENTOR(S) : Parthasarathy Ranganathan et al.

It is certified that error appears in the above-identified patent and that said Letters Patent is hereby corrected as shown below:

In the Claims

In column 12, line 57, in Claim 14, delete "a least" and insert -- at least --, therefor.

Signed and Sealed this  
Eighteenth Day of June, 2013

Teresa Stanek Rea  
*Acting Director of the United States Patent and Trademark Office*